(12) United States Patent
Esposito

(10) Patent No.: US 6,779,478 B1
(45) Date of Patent: Aug. 24, 2004

(54) SURFBOARD

(76) Inventor: Jeffrey R. Esposito, 57 Main St., East Hampton, NY (US) 11937

(*) Notice: Subject to any disclaimer, the term of this patent is extended or adjusted under 35 U.S.C. 154(b) by 0 days.

(21) Appl. No.: 10/345,838

(22) Filed: Jan. 16, 2003

Related U.S. Application Data
(60) Provisional application No. 60/349,150, filed on Jan. 16, 2002.

(51) Int. Cl.[7] ................................................. B63B 5/24
(52) U.S. Cl. ......................................... 114/357; 441/74
(58) Field of Search ............................. 441/74; 114/357

(56) References Cited

U.S. PATENT DOCUMENTS

| | | | | |
|---|---|---|---|---|
| 3,782,745 A | * | 1/1974 | Stoveken | 280/18 |
| 5,000,710 A | * | 3/1991 | Bedortha et al. | 441/129 |
| 5,348,505 A | * | 9/1994 | Rothhammer | 441/117 |
| 5,658,179 A | * | 8/1997 | Glydon et al. | 441/74 |
| 5,928,045 A | * | 7/1999 | Szabad | 441/74 |
| 6,189,932 B1 | * | 2/2001 | Kaufman | 281/37 |

* cited by examiner

Primary Examiner—Stephen Avila
(74) Attorney, Agent, or Firm—Edwin D. Schindler

(57) ABSTRACT

A surfboard made of a high-density ethyl vinyl acetate contained within a polyethylene shell is preferably produced by cutting to the shape of a conventional surfboard, a sufficient quantity of high-density ethyl vinyl acetate, which is then wrapped in a protective polyethylene shell. Thereafter, the combined high-density ethyl vinyl acetate with its polyethylene shell is heated for approximately fifteen minutes at a temperature sufficient for bonding the polyethylene shell to the high-density ethyl vinyl acetate. Once bonding is complete, the surfboard is then cooled and, if necessary, sculptured to its final shape. The final shape of the surfboard may be that of any conventional surfboard and may, preferably, include a "kick tail."

2 Claims, 3 Drawing Sheets

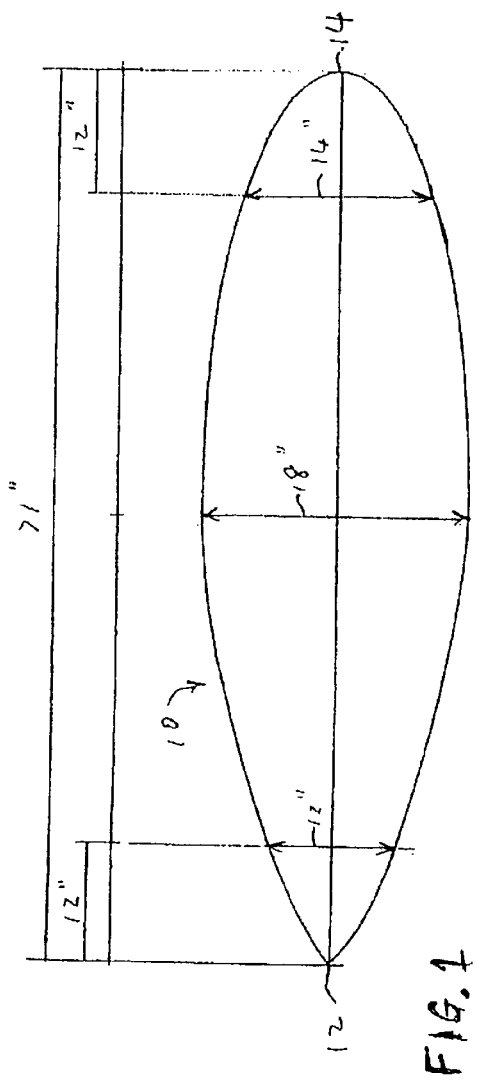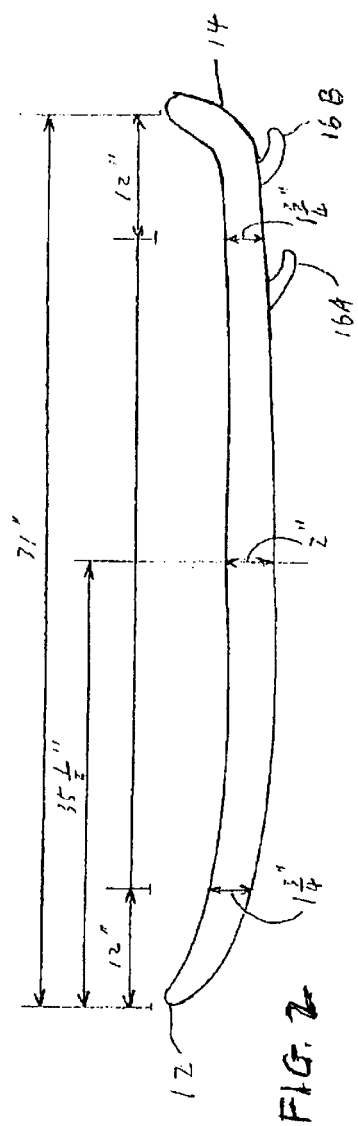

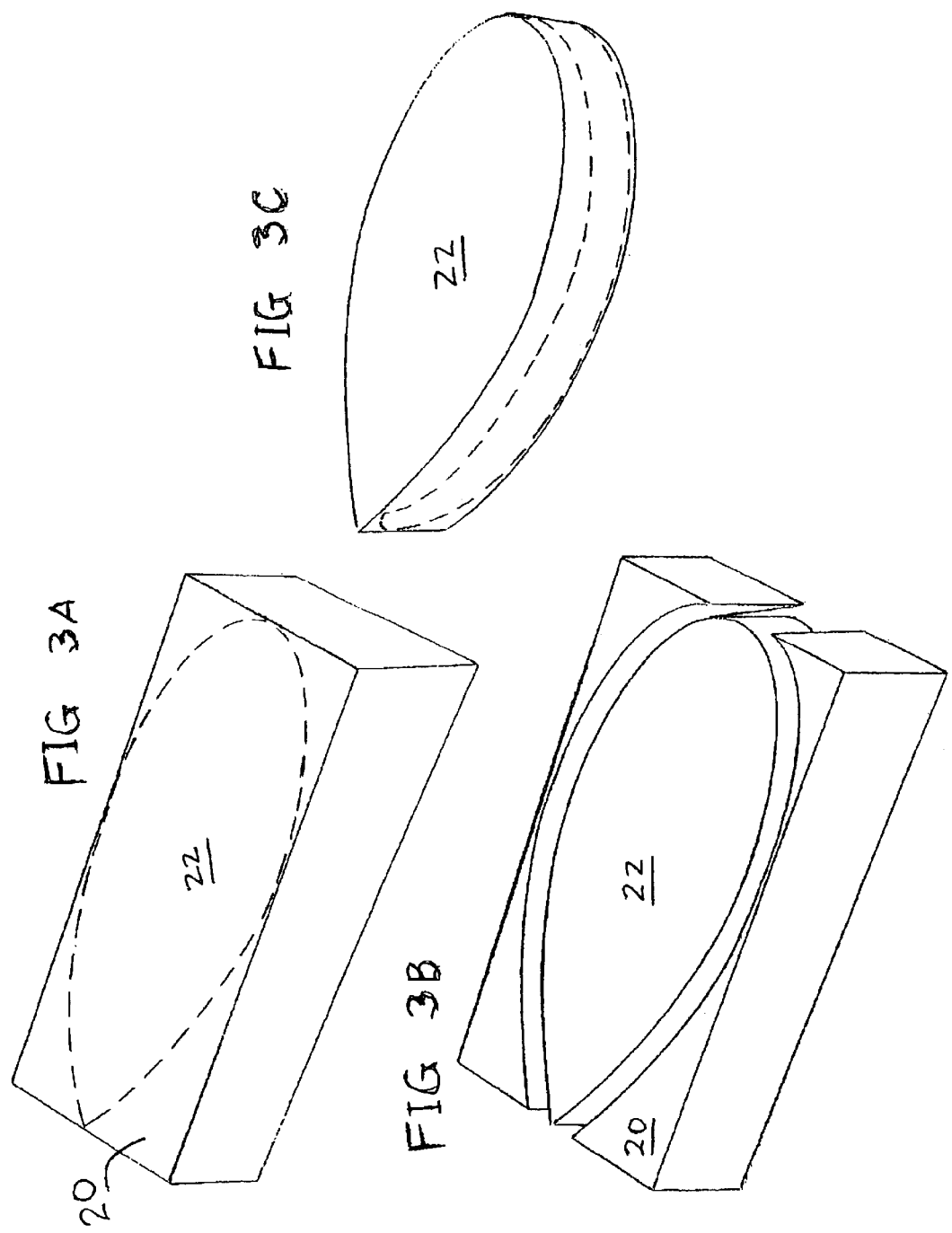

SURFBOARD

CROSS-REFERENCE TO PROVISIONAL PATENT APPLICATION

The inventor claims domestic priority, pursuant to 35 U.S.C. §119(e), on the basis of U.S. Provisional Patent Application No. 60/349,150, filed Jan. 16, 2002.

BACKGROUND OF THE INVENTION

The present invention relates, generally, to a surfboard provides its rider with greater maneuverability than conventional surfboards, and a method for its manufacture.

SUMMARY OF THE INVENTION

It is, therefore, an object of the present invention to provide a novel surfboard that yields to its user greater maneuverability, while still be cost-effective to manufacture and economical for ultimate retail purchase.

The foregoing and related objects are achieved by the present invention for a surfboard that it made of ethyl vinyl acetate and polyethylene.

The surfboard of the invention is made by cutting to the shape of a conventional surfboard, high-density ethyl vinyl acetate, which is then wrapped in a protective polyethylene shell. Thereafter, the surfboard is heated for approximately fifteen minutes at a temperature sufficient for bonding the polyethylene shell to the high-density ethyl vinyl acetate. Once bonding is complete, the surfboard is then cooled and, if necessary, sculptured to its final shape.

The final shape of the surfboard may be that of any conventional surfboard otherwise known to the skill artisan and may, preferably, include a "kick tail."

The surfboard of the present invention is both more sleek than conventional surfboards, thereby improving a rider's performance, enjoyment and maneuverability, as well as more efficient and economical to manufacture.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the accompanying drawing figures:

FIG. 1 is a top view of the surfboard of the present invention;

FIG. 2 is a left-side elevational view of the surfboard of FIG. 1, a right-side elevational view being a mirror image thereof

DETAILED DESCRIPTION OF THE DRAWING FIGURES

Figure 3F:
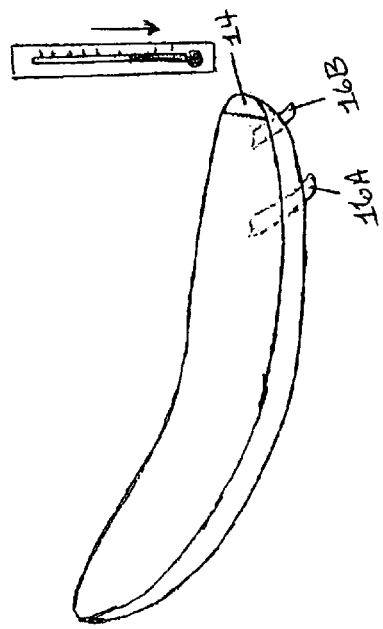
FIGS. 3A, 3B and 3C are schematic perspective views showing the tasks involved in cutting a high-density segment of ethyl vinyl acetate to a shape which is that of a surfboard.
FIG. 3D is a schematic Perspective view showing the step of wrapping the high-density ethyl vinyl acetate, shaped as a surfboard, in a polyethylene shell.
FIG. 3E is a schematic perspective view showing the step of heating the surfboard, after having wrapped it in the polyethylene shell for bonding to the high-density ethyl vinyl acetate; and, FIG. 3F is a schematic perspective view showing the step of cooling the surfboard subsequent to the heating step.

Turning now, in detail, to an analysis of the drawing figures, FIG. 1 is a top plan view of the surfboard 10 of the invention, which shows the preferred dimensions thereof. Preferably, the surfboard is 71 inches at its longest point, and 18.5 inches wide at its center. The front end of surfboard 10, is designated by reference numeral 12, while its rear end having a kick tail, is denoted by numeral 14.

FIG. 2 is a left-side elevational view of surfboard 10 of FIG. 1, showing a central thickness of, preferably, two inches. The thickness of the surfboard, preferably, diminishes to approximately 1.75 inches near the front and rear of the surfboard. In FIG. 2, this preferred thickness exists at both 12 inches from the front end 12 and rear end 14 of surfboard 10. Finally, in FIG. 2, fins 16A, 16B for the surfboard are visible.

Figure 3E:
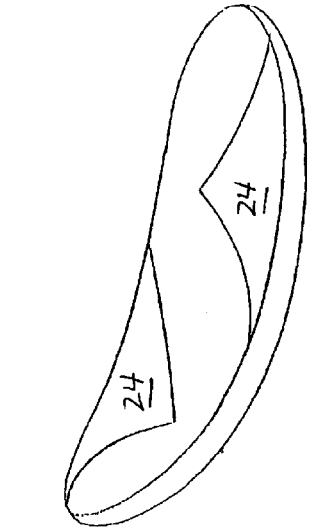
Figure 3D:
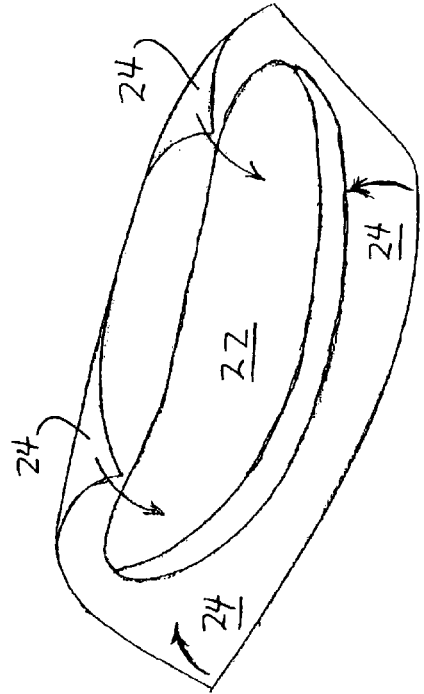

FIGS. 3A, 3B and 3C schematically show the tasks of cutting a high-density segment of ethyl vinyl acetate 20 to a shape which is that of a surfboard 22. FIG. 3D schematically shows the step of wrapping the high-density ethyl vinyl acetate having the shape of a surfboard 22 in a polyethylene shell 24. FIG. 3E shows the step of heating the surfboard 22, after it has been wrapped in the polyethylene shell 24 for approximately fifteen minutes at a temperature sufficient for bonding the polyethylene shell 24 to the high-density ethyl vinyl acetate-shaped surfboard 22. Finally, FIG. 3F schematically illustrates a subsequent cooling step.

The surfboard is, preferably, made of high-density ethyl vinyl acetate and is wrapped in a polyethylene shell.

The surfboard of the present invention provides for greater maneuverability by its user.

While only several embodiments of the present invention have been and described, it will be obvious to those skilled in the art that many modifications may be made to the present invention without departing from the spirit and scope thereof.

What is claimed is:

1. A method for manufacturing a surfboard, comprising the steps of:

cutting high-density ethyl vinyl acetate to a shape of that of a surfboard;

wrapping said high-density ethyl vinyl acetate having the shape of a surfboard in a polyethylene shell;

heating the surfboard after said wrapping in said polyethylene shell for approximately fifteen minutes at a temperature sufficient for bonding said polyethylene shell to said high-density ethyl vinyl acetate; and, cooling said surfboard subsequent to said heating step.

2. The method for manufacturing a surfboard according to claim 1, further comprising the step of adding a kicktail to said surfboard.

* * * * *